(12) United States Patent
Ci et al.

(10) Patent No.: US 12,034,300 B2
(45) Date of Patent: Jul. 9, 2024

(54) CLOUD BASED ENERGY SYSTEM

(71) Applicants: Song Ci, Omaha, NE (US); Marvin Ci, Elkhorn, NE (US)

(72) Inventors: Song Ci, Omaha, NE (US); Marvin Ci, Elkhorn, NE (US)

( * ) Notice: Subject to any disclaimer, the term of this patent is extended or adjusted under 35 U.S.C. 154(b) by 0 days.

(21) Appl. No.: 15/018,229

(22) Filed: Feb. 8, 2016

(65) Prior Publication Data
US 2016/0156189 A1    Jun. 2, 2016

Related U.S. Application Data

(63) Continuation-in-part of application No. 14/824,753, filed on Aug. 12, 2015, now Pat. No. 10,381,691, and a continuation-in-part of application No. 13/677,419, filed on Nov. 15, 2012, now Pat. No. 9,502,893.

(51) Int. Cl.
| | |
|---|---|
| *H02J 3/00* | (2006.01) |
| *G05B 15/02* | (2006.01) |
| *G06F 1/26* | (2006.01) |
| *H01M 10/42* | (2006.01) |
| *H02J 3/38* | (2006.01) |

(52) U.S. Cl.
CPC ............. *H02J 3/003* (2020.01); *G05B 15/02* (2013.01); *G06F 1/263* (2013.01); *H01M 10/425* (2013.01); *H02J 3/38* (2013.01); *H01M 2010/4271* (2013.01); *H01M 2220/20* (2013.01); *Y02B 10/30* (2013.01); *Y02B 70/30* (2013.01); *Y02E 40/70* (2013.01); *Y04S 10/12* (2013.01); *Y04S 20/221* (2013.01)

(58) Field of Classification Search
CPC ........ H02J 2003/003; H02J 3/008; H02J 3/04; H02J 3/06; H02J 3/28; H02J 3/32; H02J 13/0013; H02J 13/0017; H02J 13/0079
See application file for complete search history.

(56) References Cited

U.S. PATENT DOCUMENTS

| | | | |
|---|---|---|---|
| 4,274,043 A | 6/1981 | Heitz | |
| 5,381,554 A | 1/1995 | Langer et al. | |
| 5,514,916 A * | 5/1996 | Yang ..................... | H02J 7/0031 307/63 |
| 5,850,351 A | 12/1998 | Lotfy et al. | |
| 6,104,967 A * | 8/2000 | Hagen ................... | H02J 7/0021 429/50 |
| 6,140,799 A * | 10/2000 | Thomasson ......... | H01M 10/441 320/117 |
| 6,430,692 B1 * | 8/2002 | Kimble ................... | G06F 1/263 307/66 |

(Continued)

*Primary Examiner* — Rexford N Barnie
*Assistant Examiner* — Thai H Tran
(74) *Attorney, Agent, or Firm* — Suiter Swantz IP

(57) ABSTRACT

Cloud based energy systems and methods for managing the cloud based energy systems are disclosed. A cloud based energy system (may be referred to simply as "energy cloud") in accordance with embodiments of the present disclosure may be configured to share its energy resources and data to various energy-producing, energy-consuming, and/or energy-storage devices connected to the energy cloud. Such a configuration may enable ubiquitous, on-demand access to a shared pool of configurable energy resources, providing users with various capabilities to store and to retrieve energy as needed.

4 Claims, 4 Drawing Sheets

(56) References Cited

U.S. PATENT DOCUMENTS

| | | | |
|---|---|---|---|
| 6,583,522 B1* | 6/2003 | McNulty | H01L 31/02021 307/71 |
| 7,898,223 B2 | 3/2011 | Takeda et al. | |
| 8,330,419 B2 | 12/2012 | Kim et al. | |
| 8,427,106 B2 | 4/2013 | Kim et al. | |
| 8,816,613 B2 | 8/2014 | Lee | |
| 9,502,737 B2 | 11/2016 | Bradwell et al. | |
| 9,735,590 B2 | 8/2017 | Wang et al. | |
| 2001/0012794 A1* | 8/2001 | Nishihara | H01M 10/4207 455/574 |
| 2002/0113493 A1* | 8/2002 | Morrow | H02J 7/0024 307/71 |
| 2003/0071523 A1* | 4/2003 | Silverman | H01M 2/20 307/150 |
| 2005/0023054 A1 | 2/2005 | Weidenheimer et al. | |
| 2005/0052154 A1 | 3/2005 | Kavounas | |
| 2005/0071092 A1 | 3/2005 | Farkas et al. | |
| 2005/0146223 A1 | 7/2005 | Kanouda et al. | |
| 2006/0171329 A1* | 8/2006 | Ying | H02J 13/00004 370/254 |
| 2007/0062744 A1 | 3/2007 | Weidenheimer et al. | |
| 2007/0114852 A1 | 5/2007 | Lin et al. | |
| 2007/0276547 A1* | 11/2007 | Miller | G06Q 50/06 700/295 |
| 2007/0279953 A1 | 12/2007 | Hoff et al. | |
| 2008/0180061 A1 | 7/2008 | Koski et al. | |
| 2009/0036943 A1 | 2/2009 | Signoff et al. | |
| 2009/0050591 A1 | 2/2009 | Hart et al. | |
| 2009/0088553 A1 | 4/2009 | Kumar et al. | |
| 2009/0289500 A1* | 11/2009 | Zipp | H02J 3/14 307/31 |
| 2010/0013314 A1 | 1/2010 | Groff et al. | |
| 2010/0138066 A1* | 6/2010 | Kong | G06Q 30/018 700/295 |
| 2010/0217550 A1* | 8/2010 | Crabtree | H02J 3/005 702/62 |
| 2010/0261048 A1 | 10/2010 | Kim et al. | |
| 2010/0262043 A1 | 10/2010 | Sauter et al. | |
| 2010/0306097 A1* | 12/2010 | Greiner | G06Q 40/04 705/37 |
| 2010/0314950 A1 | 12/2010 | Rutkowski et al. | |
| 2011/0001442 A1 | 1/2011 | Lee et al. | |
| 2011/0046835 A1 | 2/2011 | Taguchi | |
| 2011/0053656 A1* | 3/2011 | Plestid | H01M 10/42 455/574 |
| 2011/0071970 A1* | 3/2011 | Massie | H02J 3/00 706/21 |
| 2011/0130721 A1 | 6/2011 | Foster et al. | |
| 2011/0181245 A1 | 7/2011 | Wey et al. | |
| 2011/0208453 A1 | 8/2011 | Ci et al. | |
| 2011/0266867 A1* | 11/2011 | Schindler | H01M 10/4207 455/574 |
| 2011/0304211 A1 | 12/2011 | Peterson et al. | |
| 2012/0029720 A1* | 2/2012 | Cherian | H02J 13/00 700/297 |
| 2012/0114996 A1* | 5/2012 | Yu | H01M 2/1077 429/99 |
| 2012/0256568 A1 | 10/2012 | Lee | |
| 2012/0319493 A1 | 12/2012 | Kim et al. | |
| 2013/0002016 A1 | 1/2013 | Furukawa et al. | |
| 2013/0320772 A1 | 12/2013 | Qiao et al. | |
| 2014/0312828 A1 | 10/2014 | Vo et al. | |
| 2015/0130421 A1 | 5/2015 | Bevilacqua, III | |
| 2015/0137741 A1 | 5/2015 | Gurries et al. | |
| 2016/0036252 A1 | 2/2016 | Peterswerth et al. | |

* cited by examiner

CLOUD BASED ENERGY SYSTEM

CROSS-REFERENCE TO RELATED APPLICATIONS

This application is a continuation-in-part of U.S. patent application Ser. No. 13/677,419 filed on Nov. 15, 2012, which is herein incorporated by reference in its entirety.

This application is a continuation-in-part of U.S. patent application Ser. No. 14/824,753 filed on Aug. 12, 2015, which is herein incorporated by reference in its entirety.

TECHNICAL FIELD

The present invention relates to the field of electrical power supply and particularly to systems and methods for providing battery based electrical power supplies.

BACKGROUND

Batteries are essential for operations of data centers, server farms, electric vehicles and the like. A conventional battery typically includes multiple battery cells wired in a manner that satisfies certain requirements. Conventional batteries, however, are not dynamically adjustable and are not designed to handle rapidly changing operating environment.

SUMMARY

Accordingly, an embodiment of the present disclosure is directed to a distributed power system. The distributed power system may include a plurality of nodes connected to an energy network. Each particular node of the plurality of nodes may include at least one of: an energy-producing device, an energy-consuming device, and an energy-storage device. Each particular node of the plurality of nodes may further include a network interface card.

The network interface card of each particular node may be configured to: determine whether a level of power supply available to the particular node is sufficient to meet a level of demand required at the particular node; conditionally request supplemental power from the energy network when the level of power supply available to the particular node is insufficient to meet the level of demand required at the particular node; and conditionally release supplemental power to the energy network upon receiving a request from the energy network when the level of power supply available to the particular node is sufficient to meet the level of demand required at the particular node.

An additional embodiment of the present disclosure is directed to a network interface card for a node connected to an energy network. The network interface card may include at least one electrical connector, at least one data connector, and at least one controller in communication with the at least one electrical connector and the at least one data connector. The at least one controller may be configured to: determine whether a level of power supply available to the node is sufficient to meet a level of demand required at the node; conditionally request supplemental power from the energy network when the level of power supply available to the node is insufficient to meet the level of demand required at the node; and conditionally release supplemental power to the energy network via the at least one electrical connector upon receiving a request from the energy network via at least one data connector when the level of power supply available to the node is sufficient to meet the level of demand required at the node.

Another embodiment of the present disclosure is directed to a method for managing a distributed power system that includes a plurality of nodes connected to an energy network. The method may include: for each node i of the plurality of nodes, determining whether the node i have sufficient power supply based on a level of power supply available to the node i and a level of demand required at the node i; identifying a set of nodes that have insufficient power supply; and adjusting output power of the nodes that have sufficient power supply to provide supplemental power to the set of nodes that have insufficient power supply.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Embodiments in accordance with the present disclosure are directed to cloud based energy systems and methods for managing the cloud based energy systems. The term "cloud" refers to an infrastructure that is built and managed over a private or a public network. A cloud based energy system (may be referred to simply as "energy cloud") in accordance with embodiments of the present disclosure may be configured to share its energy resources and data to various energy-producing, energy-consuming, and/or energy-storage devices connected to the energy cloud. Such a configuration may enable ubiquitous, on-demand access to a shared pool of configurable energy resources, providing users with various capabilities to store and to retrieve energy as needed.

Figure 1:
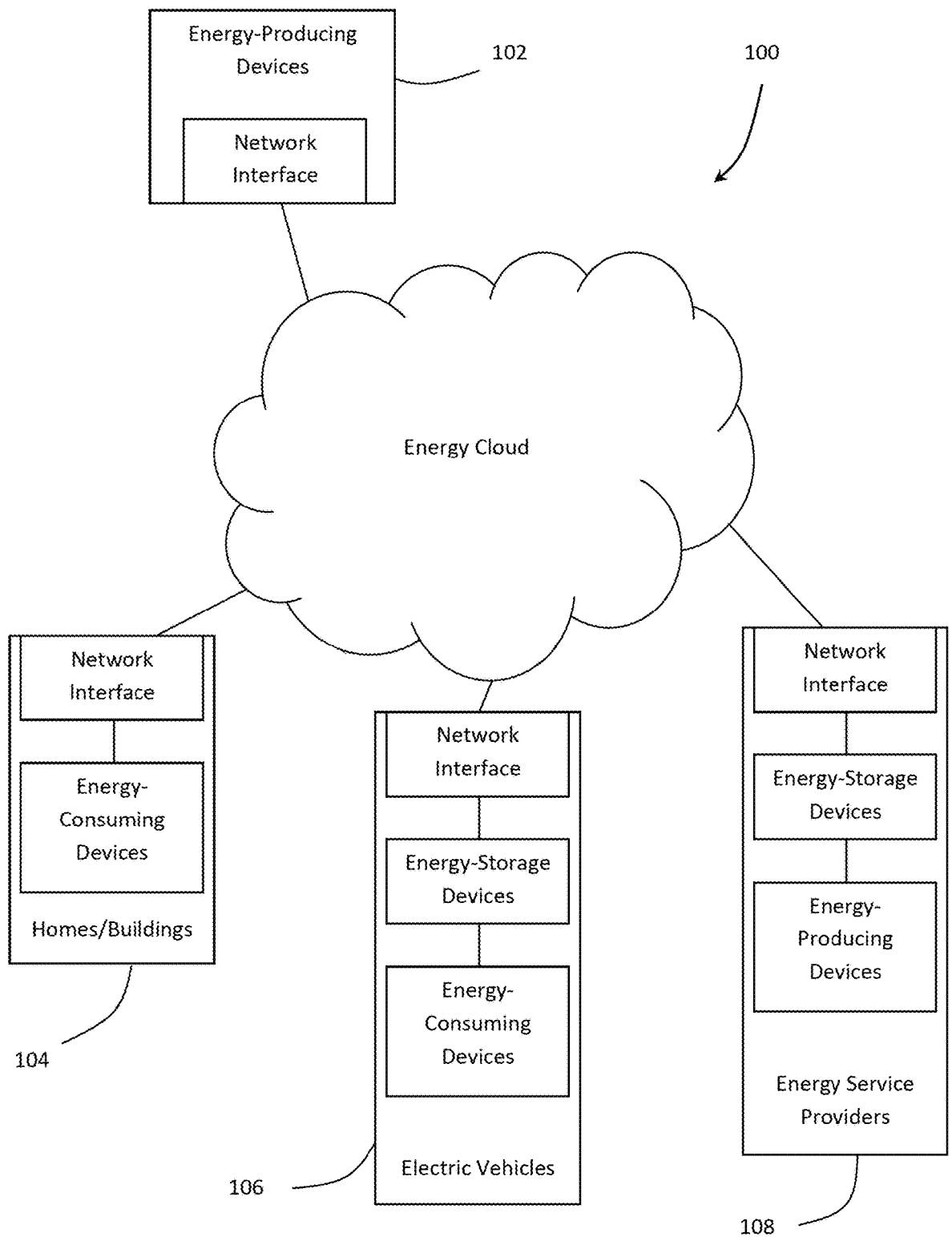
FIG. 1 is a block diagram depicting an exemplary cloud based energy system in accordance with the present disclosure.

Referring to FIG. 1, a block diagram illustrating an exemplary energy cloud 100 configured in accordance with the present disclosure is shown. The energy cloud 100 may be formed as a collection of various nodes 102 through 108 participating on a network. The network may be a private or a public network, which may be optionally implemented as an integrated component or as a supplemental component to an existing power grid.

In the example depicted in FIG. 1, each node participating on the network may include a network interface card/circuit that enables exchange of both power and data with other nodes over the network. Some nodes (e.g., a power plant 102) may include energy-producing devices such as electric generators, wind turbines or the like. Some nodes (e.g., a house 104) may include energy-consuming devices such as computers, appliances and other electronics. Some nodes (e.g., an electric vehicle 106) may include energy-storage devices such as batteries, and some nodes (e.g., an energy service provider 108) may include both energy-producing devices (to generate energy when needed) and energy-storage devices (to store energy when not consumed).

It is to be understood that the nodes 102 through 108 shown in FIG. 1 are merely exemplary and are not meant to be limiting. For instance, a house may include energy-producing devices such as solar panels or the like in addition to energy-consuming devices depicted in the figure. It is therefore contemplated that a given node participating on the network may include one or more energy-producing devices, one or more energy-consuming devices, one or more energy-storage device, and/or a combination thereof. It is also contemplated that any energy-producing, energy-consuming, or energy-storage device may be considered as a node without departing from the spirit and scope of the present disclosure.

It is noted that while the nodes 102 through 108 may be located at various local, regional, national, or global locations, they may be functionally connected as long as the network interface card of each node can communicate with each other (through wired or wireless data communication means). It is also noted that by joining the nodes 102 through 108 together, a shared pool of configurable energy resources can be formed, providing each node with on-demand access to the shared pool of configurable energy resources and allowing each node to store and/or to retrieve energy as needed.

In some embodiments, the network interface card of the nodes 102 through 108 may jointly form a distributed power management system, such as that disclosed in U.S. patent application Ser. No. 13/677,419 filed on Nov. 15, 2012 and entitled "Distributed Power Supply System and Method", which is incorporated herein by reference. In other words, the network interface card of each node may include one or more processors configured to provide power management for that particular node in a manner similar to the management unit disclosed in U.S. patent application Ser. No. 13/677,419. More specifically, the network interface card of each node may be configured to estimate the level of power supply available to that node and the level of demand at that node. The network interface card of each node may exchange the data with other network interface cards in the energy cloud 100 and jointly determine (e.g., implementing a distributed computing system) whether any adjustment is needed with regards to power distribution among the various nodes. Alternatively, the network interface cards may report the data to one or more dedicated controllers on the network, which may carry out the process to help determine whether any adjustment is needed. In another alternative implementation, a subset of network interface cards (e.g., the network interface card of an energy service provider 108) may be dedicated to carry out this process without departing from the spirit and scope of the present disclosure.

Regardless of the specific implementation (e.g., using distributed computing and/or dedicated controllers), the purpose of this process is to help determine whether (and how) to adjust power distribution among the various nodes based on supply and demand at each node. For example, in the event that the level of power supply currently available to a particular node is deemed to be insufficient to meet the level of demand required at that particular node, supplemental power (provided by other nodes on the cloud 100) may be requested. On the other hand, if the level of power supply currently available to a particular node is deemed to be sufficient to meet the level of demand required at that particular node, some of its available power supply may be shared with other nodes upon request.

It is contemplated that various techniques may be utilized to help estimate the level of power supply available to each node. For example, if a node includes an energy-producing device, the level of production of that energy-producing device may be estimated and reported as a part of the power supply available to that node. If a node draws power from mains, the amount of mains power available to that node may be estimated and reported as a part of the power supply available to that node. In addition, if a node includes an energy-storage device (e.g., batteries or the like), the state of charge (SOC) of the energy-storage device may be estimated and reported as a part of the power supply available to that node. Furthermore, if a node includes a combination of energy-producing devices, energy-storage devices, as well as the ability to draw power from mains, the level of power supply available to that node may include the combination thereof.

With the supply and demand estimated for each node, various techniques may be utilized to help determine how to adjust power distribution among the various nodes based on the estimated supply and demand. For example, let $S_i$ and $D_i$ denote supply and demand reported by node i in the energy cloud 100, the following determination may be made:

1) If $S_i - D_i \geq S_{threshold}$, the power supply available to node i may be considered sufficient to meet the level of demand required at node i; and
2) If $S_i - D_i < S_{threshold}$, the power supply available to node i may be considered insufficient to meet the level of demand required at node i, with only $S_i - S_{threshold}$ available locally, and may need a supplemental power of $\Delta D_i = D_i - S_i + S_{threshold}$;

Wherein $S_{threshold}$ denotes a configurable threshold.

Based on the definition above, a set of nodes (denoted as $\Psi$) having insufficient local power supply may be identified. Let $\Theta$ denote the set of all nodes in the energy cloud 100, $\Theta - \Psi$ therefore denotes the set of nodes with sufficient local power supply. A node j, $j \in (\Theta - \Psi)$ may therefore need to provide power not only to meet its local demand, but also to the nodes in $\Psi$. Now let $x_j$ denote the amount of power node j needs to provide to nodes in $\Psi$, the value of $x_j$ can be determined utilizing an optimization function defined as follows:

$$\text{Minimize}$$
$$\sum_{j \in (\Theta - \Psi)} \frac{x_j}{S_i - D_i - S_{threshold}}$$
$$\text{Subject to:}$$
$$\sum_{j \in (\Theta - \Psi)} x = \sum_{i \in \Psi} \Delta D_i$$
$$x_j \geq 0, \forall j \in (\Theta - \Psi)$$

It is contemplated that various techniques/algorithms may be utilized to solve the optimization function defined above to obtain the value of $x_j$, $j \in (\Theta - \Psi)$. The $x_j$ value may then be provided to each node $j \in (\Theta - \Psi)$. Upon receiving the $x_j$ value, the network interface card of node j may help control the node j to release (and/or to generate, if node j includes one or more energy-producing devices) the amount of power from node j to the energy cloud 100 according to the $x_j$ value. The nodes in Ψ, i.e., the nodes that requested to receive supplemental power from the energy cloud 100, may then draw the amount of power requested from the energy cloud 100 as supplemental power supply.

It is to be understood that the optimization function described above is merely exemplary and is not meant to be limiting. It is contemplated that other techniques may be utilized to help determine how to adjust power distribution among the various nodes without departing from the spirit and scope of the present disclosure.

Figure 2:
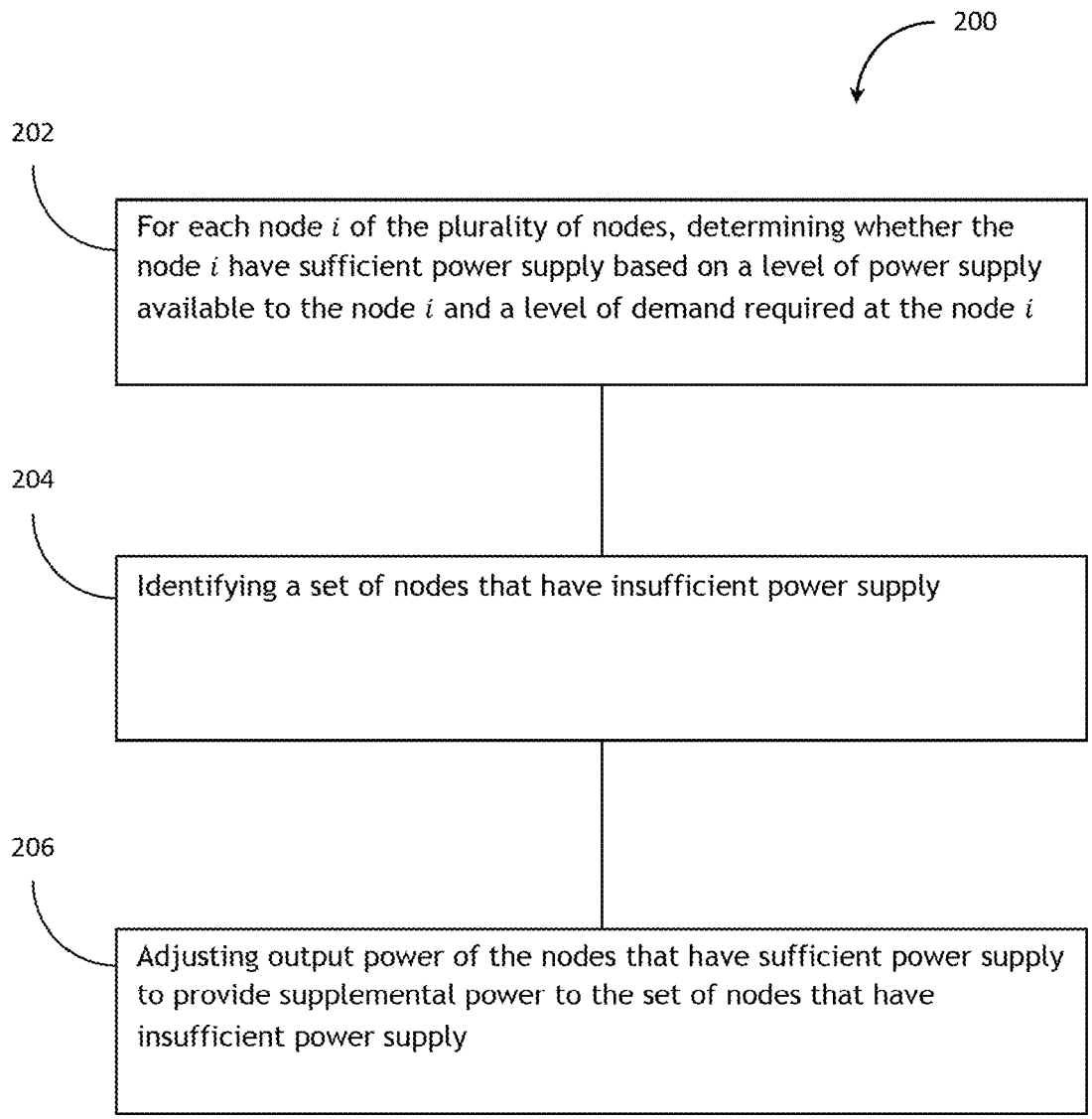
FIG. 2 is a flow diagram depicting an exemplary method for managing a cloud based energy system.

Referring now to FIG. 2, a flow diagram depicting an exemplary method 200 for managing a cloud based energy system is shown. A step 202 may determine, for each node i of the plurality of nodes, whether the node i have sufficient power supply based on the level of power supply available to the node i and a level of demand required at the node i. Step 204 may then identify a set of nodes that have insufficient power supply. Step 206 may subsequently adjust output power of the nodes that have sufficient power supply to provide supplemental power to the set of nodes that have insufficient power supply (as described above).

Figure 3:
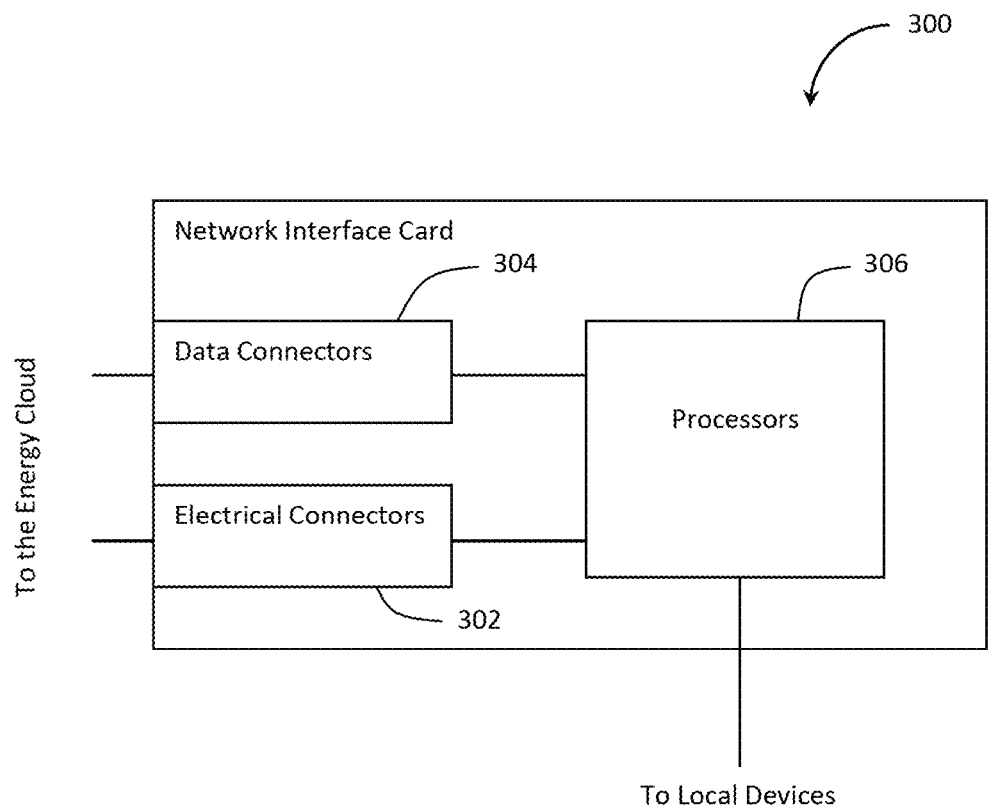
FIG. 3 is a block diagram depicting an exemplary network interface card that may be utilized in the exemplary cloud based energy system shown in FIG. 1.

Referring now to FIG. 3, a block diagram depicting an exemplary network interface card 300 is shown. The network interface card 300 may be utilized to help a node function properly on the energy cloud 100. The network interface card 300 may include one or more electrical connectors 302 and one or more data connectors 304 configured to facilitate exchange of both energy and data with other network interface cards (of other nodes). The network interface card 300 may also include one or more processors/controllers 306. The one or more controllers 306 may be configured to determine whether the level of power supply available to the node is sufficient to meet the level of demand required at the node. If the level of power supply available to the node is insufficient to meet the level of demand required at the node, the one or more controllers 306 may conditionally request supplemental power from the energy network. On the other hand, if the level of power supply available to the node is sufficient to meet the level of demand required at the node, the one or more controllers 306 may conditionally release supplemental power from the node to the energy network upon receiving a request from the energy network.

It is contemplated that while the network interface card 300 may be implemented as a single hardware component, such an implementation is merely exemplary and is not meant to be limiting. It is contemplated that the network interface card 300 may be implemented as physically separated hardware components without departing from the spirit and scope of the present disclosure. Furthermore, it is contemplated that different nodes on the energy network may not need to use the same type of network interface card. Different types of network interface cards can be utilized without departing from the spirit and scope of the present disclosure, as long as they are configured to be compatible with each other.

It is also contemplated that the energy-storage devices referenced above may be configured in various manners, including energy-storage devices that are similar to the power supply units disclosed in U.S. patent application Ser. No. 13/677,419. More specifically, the energy-storage devices may include switch boards that may allow the energy-storage devices to be charged, discharged, or bypassed. These energy-storage devices may be controlled by their corresponding network interface cards, which may control the energy-storage devices based on the determination as to whether (and how) power distribution among the various nodes should be adjusted.

It is further contemplated that some of the energy-storage devices may implement modular batteries configured in manners similar to the batteries disclosed in U.S. patent application Ser. No. 14/824,753. More specifically, some of the energy-storage devices may include batteries that are arranged in dynamically adjustable manners so that the connections among the batteries (and/or the battery cells within the batteries) can be adjustable to meet a given output requirement.

Figure 4:
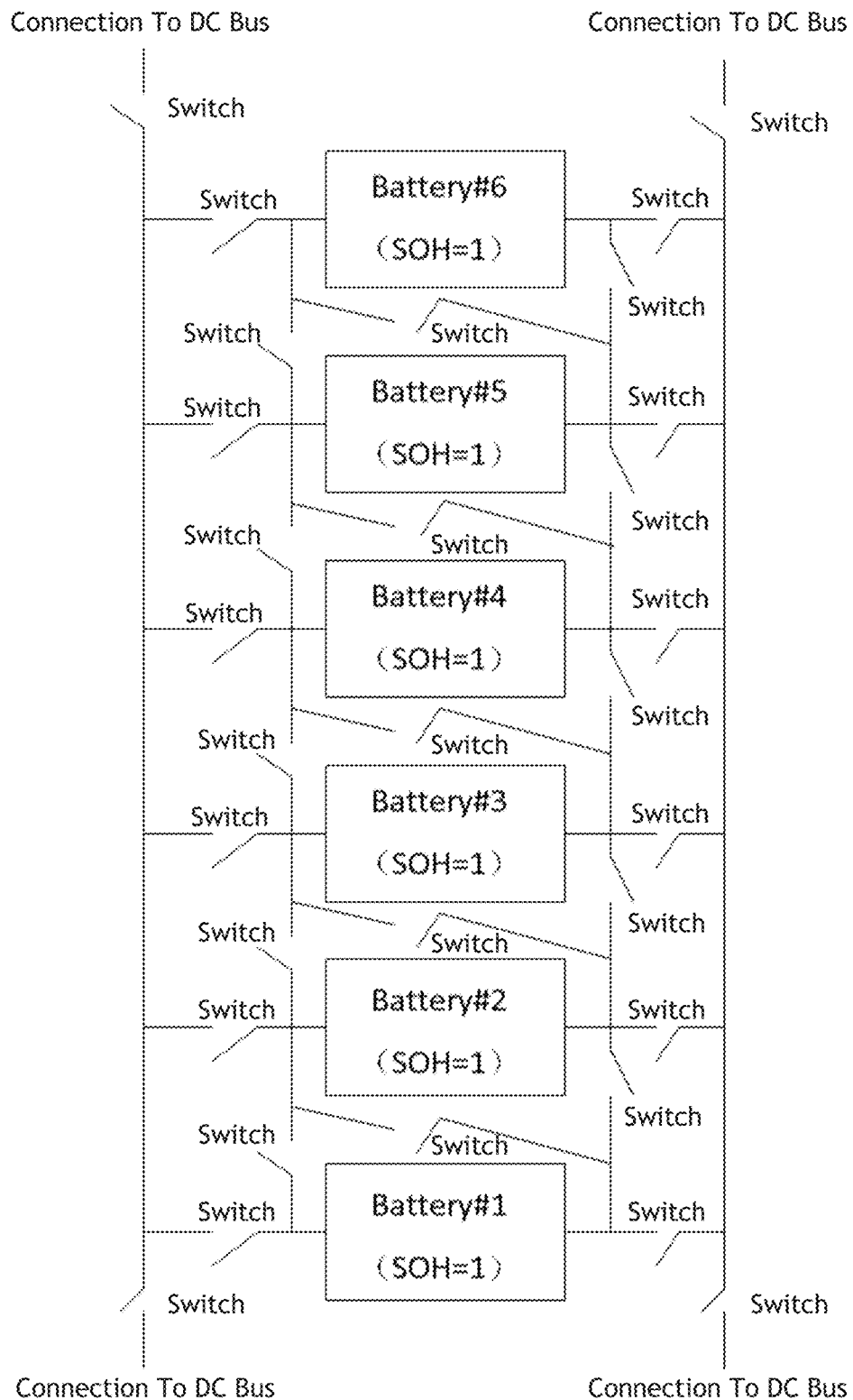
FIG. 4 is a block diagram depicting an adjustable battery unit.

One embodiment of the present disclosure is directed to a system and method for providing distributed power supply with consideration of battery status of charge (SOC) level and the power load level. In accordance with the present disclosure, power storage units (e.g., batteries) are distributed across various components (e.g., servers) of the computing system. It is contemplated that the battery unit included in each power storage unit may include one or more individual batteries arranged in series, parallel, or combination of series and parallel. The individual batteries may also be arranged in a dynamically adjustable manner as shown in FIG. 4. The various switches depicted in FIG. 4 allow the connection among the individual batteries to be adjustable to meet the output requirement. It is also contemplated that each individual battery may include one or more battery cells arranged in a series, a parallel, or an adjustable manner without departing from the spirit and scope of the present disclosure.

It is to be understood that while the exemplary energy cloud 100 presented above may span across a relatively large area, such implementations are not meant to be limiting. An energy cloud implemented in accordance with the present disclosure may be configured to cover an area of any size without departing from the spirit and scope of the present disclosure.

It is to be understood that the present disclosure may be conveniently implemented in forms of a hardware/firmware/software package. Such a package may be a computer program product which employs a computer-readable storage medium including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description. It is also believed that it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A network interface card for a node connected to an energy network, the network interface card comprising:
   at least one electrical connector configured to transfer power;
   at least one data connector configured to transfer data, the at least one data connector being separate from the at least one electrical connector; and
   at least one controller coupled with the at least one electrical connector, the at least one data connector, and one or more energy-storage devices, the at least one controller configured to:
      determine whether to charge, discharge or bypass the one or more energy-storage devices;
      determine whether a level of power supply available at the one or more energy-storage devices is sufficient to meet a level of demand required at the node;
      conditionally request supplemental power from the energy network when the level of power supply available to the node is insufficient to meet the level of demand required at the node via the at least one data connector;
      conditionally release supplemental power to the energy network via the at least one electrical connector upon receiving a request from the energy network via at least one data connector when the level of power supply available at the one or more energy-storage devices is sufficient to meet the level of demand required at the node; and
      dynamically adjust connections between individual battery cells of the one or more energy-storage devices based on at least a status of charge of the individual battery cells in the one or more energy-storage devices, wherein the at least one controller, the at least one electrical connector, and the at least one data connector are physically separated hardware components.

2. The network interface card of claim 1, wherein the network interface card and network interface cards of other nodes connected to the energy network are configured to facilitate exchange of power via the at least one electrical connector and data with each other via the at least one data connector over the energy network.

3. The network interface card of claim 1, wherein the at least one controller includes at least one processor.

4. The network interface card of claim 1, wherein the controller is configured to determine a state of charge (SOC) of the one or more energy-storage devices.

* * * * *